United States Patent
Ruiz Lara et al.

(10) Patent No.: US 11,352,142 B2
(45) Date of Patent: Jun. 7, 2022

(54) SECONDARY PERSONAL ITEM SUPPORT

(71) Applicant: Safran Seats USA LLC, Gainesville, TX (US)

(72) Inventors: Oscar Ruiz Lara, Versailles (FR); Arthur Glain, Boulogne-Billancourt (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/268,865

(22) PCT Filed: Aug. 24, 2018

(86) PCT No.: PCT/IB2018/056460
§ 371 (c)(1),
(2) Date: Feb. 16, 2021

(87) PCT Pub. No.: WO2020/039237
PCT Pub. Date: Feb. 27, 2020

(65) Prior Publication Data
US 2021/0316867 A1    Oct. 14, 2021

(51) Int. Cl.
*B64D 11/06*    (2006.01)
(52) U.S. Cl.
CPC ................. *B64D 11/0638* (2014.12)
(58) Field of Classification Search
CPC .. A47C 7/68; A47C 7/70; B60N 3/004; B64D 11/0638
USPC ........................................... 108/44; 297/146
See application file for complete search history.

(56) References Cited

U.S. PATENT DOCUMENTS

| | | | | |
|---|---|---|---|---|
| 80,106 | A * | 7/1868 | Abbott et al. | B60N 3/004 |
| | | | | 297/163 |
| 1,034,678 | A * | 8/1912 | Berger et al. | B60N 2/3084 |
| | | | | 297/112 |
| 2,619,395 | A * | 11/1952 | Kent | B60N 3/004 |
| | | | | 108/38 |
| 3,596,987 | A * | 8/1971 | Wilson | B64D 11/06 |
| | | | | 297/188.07 |

(Continued)

FOREIGN PATENT DOCUMENTS

| | | | | |
|---|---|---|---|---|
| DE | 102014212635 A1 * | 12/2015 | | B64D 11/0627 |
| EP | 2708413 A1 * | 3/2014 | | B60N 3/004 |

(Continued)

OTHER PUBLICATIONS

International Patent Application No. PCT/IB2018/056460, International Search Report and Written Opinion, dated May 8, 2019.

*Primary Examiner* — Jose V Chen
(74) *Attorney, Agent, or Firm* — Kilpatrick Townsend & Stockton LLP

(57) ABSTRACT

A passenger seat back can include a rearward surface, a tray table (106) deployable away from the rearward surface of the seat back, and a shelf (108) independent from the tray table (106). The shelf (108) can include a support surface (110) and at least one pivot (116) pivotally coupling the support surface (110) to the rearward surface of the seat back. For example, the support surface (110) may support a passenger's personal entertainment device or other item at a variety of viewing orientations and apart from the tray table (106).

20 Claims, 12 Drawing Sheets

(56) References Cited

U.S. PATENT DOCUMENTS

| | | | | |
|---|---|---|---|---|
| 3,615,118 | A * | 10/1971 | Buxton | B64D 11/0636 297/188.07 |
| 3,773,381 | A * | 11/1973 | Brennan | A47C 7/70 297/167 |
| 3,795,422 | A * | 3/1974 | Robinson | B64D 11/0007 297/146 |
| 4,726,621 | A * | 2/1988 | Muller | B61D 33/00 297/146 |
| 6,494,533 | B1 * | 12/2002 | Bohler | B60N 3/004 297/146 |
| 7,500,716 | B2 * | 3/2009 | Guerin | B64D 11/00153 297/146 |
| 8,814,245 | B1 * | 8/2014 | Welch | B60R 7/02 296/37.16 |
| 8,934,063 | B2 * | 1/2015 | Boyer, Jr. | B64D 11/00153 348/837 |
| 2006/0214479 | A1 * | 9/2006 | Dwire | B60N 3/004 297/163 |
| 2011/0216483 | A1 * | 9/2011 | Vesely | G06F 1/1624 361/679.01 |
| 2015/0020715 | A1 * | 1/2015 | Pajic | B64D 11/0638 108/3 |
| 2016/0039525 | A1 * | 2/2016 | Pajic | H02J 7/342 108/44 |
| 2016/0143435 | A1 * | 5/2016 | Kim | A47B 23/00 248/447.1 |
| 2016/0249073 | A1 * | 8/2016 | Margis | B64D 11/00152 |
| 2016/0280376 | A1 | 9/2016 | Pozzi et al. | |
| 2017/0036766 | A1 * | 2/2017 | Dall'Era | B64D 11/0638 |
| 2018/0118343 | A1 | 5/2018 | Castaing et al. | |
| 2019/0283881 | A1 * | 9/2019 | Colletti | B60N 3/004 |
| 2019/0308538 | A1 * | 10/2019 | Buchanan | A47B 1/10 |

FOREIGN PATENT DOCUMENTS

| | | | | |
|---|---|---|---|---|
| EP | 3566946 | A1 * | 11/2019 | B64D 11/00 |
| EP | 3666650 | A1 * | 6/2020 | B64D 11/00152 |
| JP | 2010111345 | A * | 5/2010 | B60N 3/004 |
| WO | 2015013661 | A1 | 1/2015 | |
| WO | WO-2015013661 | A1 * | 1/2015 | B64D 11/00152 |
| WO | WO-2016140631 | A1 * | 9/2016 | B64D 11/0638 |
| WO | 2017074271 | A1 | 5/2017 | |
| WO | WO-2018057117 | A1 * | 3/2018 | B64D 11/00151 |
| WO | WO-2019156846 | A1 * | 8/2019 | F16G 9/00 |
| WO | WO-2021021170 | A1 * | 2/2021 | B64D 11/0638 |

* cited by examiner

SECONDARY PERSONAL ITEM SUPPORT

FIELD OF THE INVENTION

The field of the invention relates to support surfaces attached to seat backs for passenger vehicles such as aircrafts.

BACKGROUND

Inside an airplane, space is very limited and therefore valuable. Airlines aim to optimize how they use the space to ensure they meet their profit goals and to achieve the required density level in economy class. To do this, the area allocated to each seat is typically minimized to be as small as possible, which can be uncomfortable for the passenger, especially for long flights. Often, a passenger will bring personal items with them to provide entertainment during the flight, but there is not always space to store those items so that they remain readily available for when the passenger desires to use them.

Conventionally, there are two locations in each economy class seat where the passenger can place his or her belongings. The first location is the tray table. When the tray table is deployed, the passenger may place his or her personal items on the tray table. These items are then readily available, but the space provided by the tray table may be insufficient depending on the number of personal items the passenger has or if the meal or drink service has arrived, which may result in the items needing to be relocated someplace else. Additionally, when the tray table is deployed, the surface of the tray table typically tends to be approximately horizontal to the floor, and thus there is not an appropriate surface on which to place and hold a tablet, cellphone, or other personal electronic device at an appropriate viewing orientation.

The second location where the passenger can place his or her belongings is the seat back pocket. However, this area does not always provide readily available access, e.g., if the tray table is deployed. Additionally, items can easily be forgotten when placed in the seat back pocket.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments of the present invention, a passenger seat may include: a seat back including a rearward surface; a tray table deployable away from the rearward surface of the seat back; and a shelf independent from the tray table and including a support surface and at least one pivot pivotally coupling the support surface to the rearward surface of the seat back.

In some embodiments, the support surface may be pivotally coupled to the rearward surface of the seat back for movement between (a) a stowed position in which the shelf is located between the rearward surface and the tray table, and (b) a deployed position in which the shelf is pivoted away from the rear surface.

In some embodiments, the passenger seat may further include at least one stopper that maintains the support surface in at least one intermediate deployed position in between the stowed position and the deployed position.

The at least one pivot may include a left pivot and a right pivot. The left pivot may be attached to the rearward surface of the seat back and to a left side of a tray table latch. The right pivot may be attached to the rearward surface of the seat back and to a right side of the tray table latch.

The at least one pivot, in certain embodiments, may be attached to the rearward surface at least partially above a position of a tray table outer edge that is uppermost on the tray table in a stowed tray table configuration.

In some embodiments, the shelf in the deployed position may be positioned over the tray table in a deployed tray table configuration and may be positioned so that the tray table is between the shelf and the rearward surface in a stowed tray table configuration.

According to certain embodiments of the present invention, a shelf may include: a support surface; at least one pivot; and at least one stopper. The support surface may be pivotally coupleable by the at least one pivot with a rearward surface of a seat back of a passenger seat for movement of the support surface between a stowed position and a maximum deployed position. The at least one stopper that maintains the support surface in at least one intermediate deployed position in between the stowed position and the maximum deployed position.

In some embodiments, the shelf may be independent of a tray table deployable from the rearward surface of the seat back of the passenger seat.

The shelf in the at least one intermediate deployed position, in certain embodiments, may be accessible with the tray table stowed relative to the seat back.

In some embodiments, in the stowed position, the support surface may be positioned between the seat back and the tray table.

In certain embodiments, in the stowed position, the support surface may be positioned parallel to the rearward surface of the seat back.

The maximum deployed position may be three degrees above horizontal in a reclined state of the seat back.

The stopper, in some embodiments, may include a continuous friction interface configured to allow the shelf to pivot smoothly to and remain at the at least one intermediate deployed position.

The stopper, in certain embodiments, may include at least one predetermined pivot stop configured to allow the shelf to incrementally pivot to and remain at the at least one intermediate deployed position.

The shelf may include at least one retainer.

In some embodiments, the retainer may include at least one of: at least one strap; at least one projection; or at least one extender extendable from at least one of a bottom edge, a left edge, or a right edge of the support surface.

According to certain embodiments of the present invention, a method may include: deploying a tray table from a rearward side of a passenger seat; exposing a space behind the tray table as a result of the deploying the tray table; and deploying a shelf from the space exposed.

In some embodiments, the method may further include: supporting an object on a support surface of the shelf.

The method may further include: stowing the tray table along the rearward side of the passenger seat while the shelf is maintained in a deployed position.

In certain embodiments, the deploying the shelf may include pivoting the shelf away from the rearward side of the passenger seat and about a pivot member that pivotally couples the shelf with the rearward side of the passenger seat.

DETAILED DESCRIPTION

Figure 1:
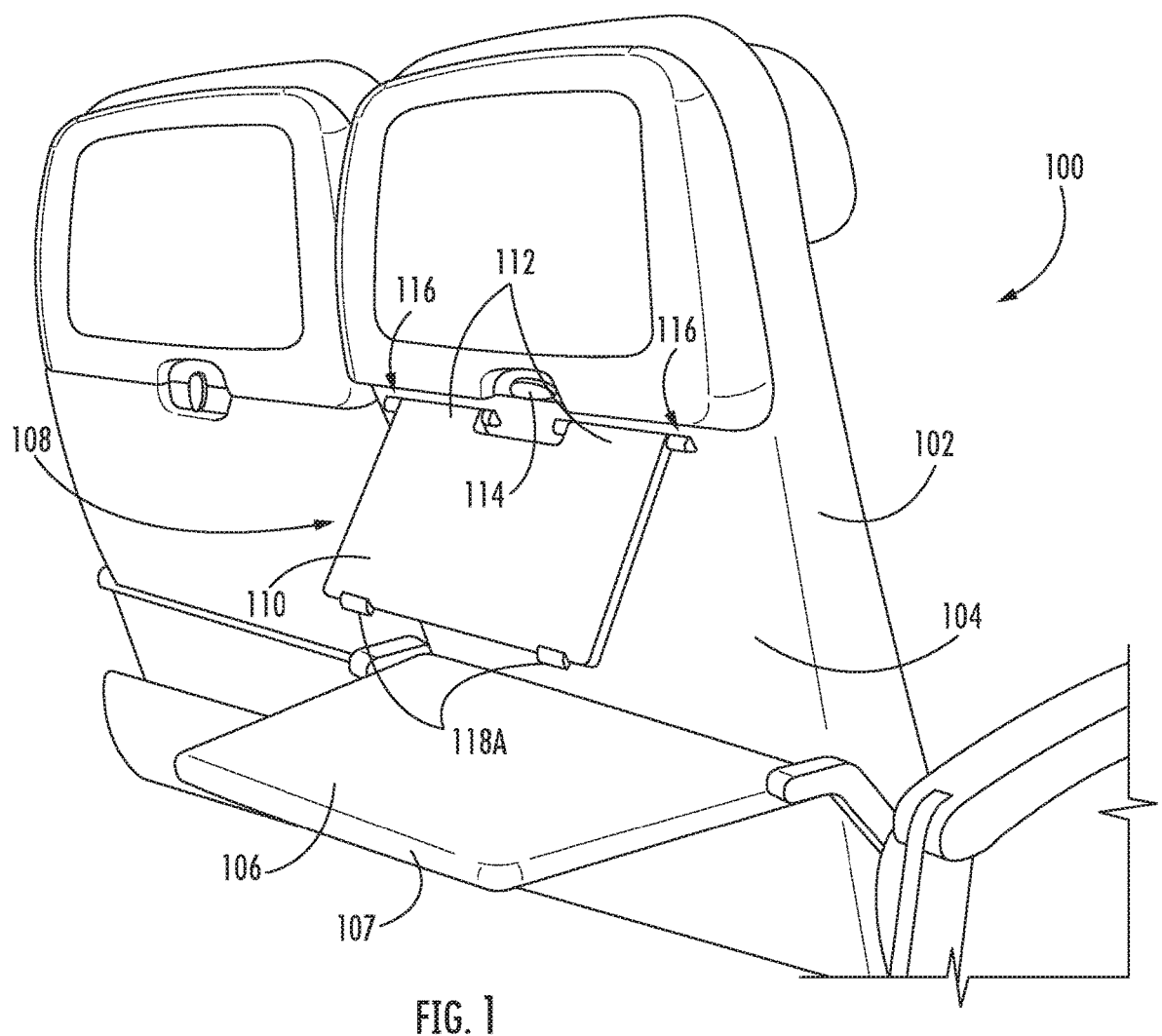
FIG. 1 is a perspective rear view of a seat with a secondary personal item support in a deployed position, according to certain embodiments of the present invention.
Figure 2:
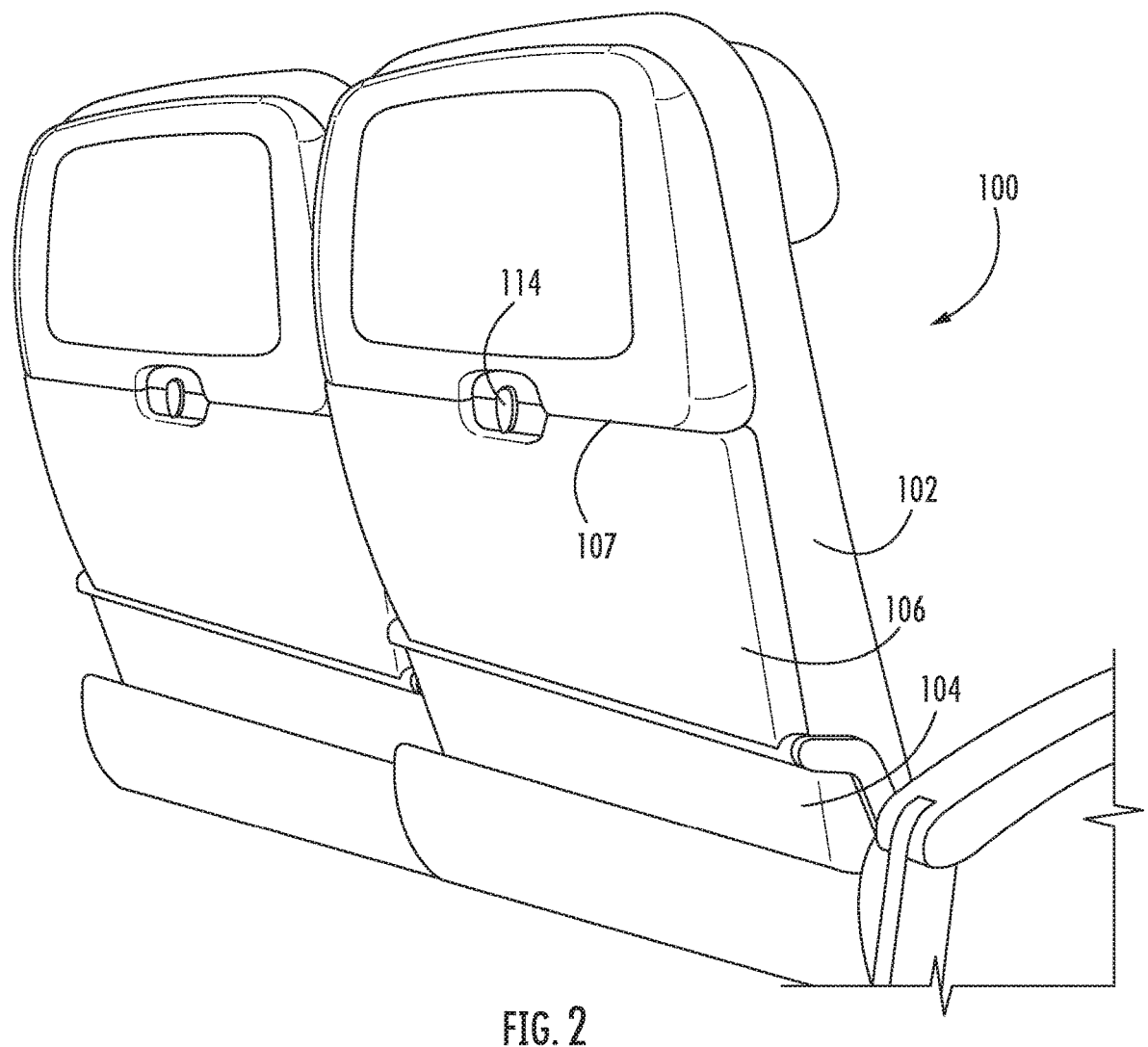
FIG. 2 is a perspective rear view of the seat of FIG. 1 with the secondary personal item support in a stowed position.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a secondary personal item support for passenger seats. While the secondary personal item support is discussed for use with aircraft seats, it is by no means so limited. Rather, embodiments of the secondary personal item support may be used in passenger seats or other seats of any type or otherwise as desired.

According to certain embodiments of the present invention, such as shown in FIGS. 1-11, a secondary personal item support or shelf 108 can include a support surface 110. The shelf 108 can additionally include or be coupled with at least one pivot 112.

The at least one pivot 112 may be coupled to the support surface 110 and a rearward surface 104 of a seat back 102 of a passenger seat 100. The at least one pivot 112 may pivotally couple the support surface 110 to the rearward surface 104 and enable a rotational movement of the shelf 108 relative to the rearward surface 104 of the seat back 102. The at least one pivot 112 may be any sort of assembly that allows pivoting of the shelf 108. As non-limiting examples, the at least one pivot 112 may be or include a hinge, a ball and socket connection, or any other suitable connection that permits rotational movement.

In some embodiments, the at least one pivot 112 may include or be coupled with a stopper 116. The stopper 116 may enable the user to control the positioning of the shelf 108 by maintaining the shelf 108 at any among various angles relative to the seat back 102. Further description of examples of the stopper 116 will be provided with respect to FIGS. 12 and 13 below.

In some embodiments, the shelf 108 and/or support surface 110 may be rectangular, trapezoidal, triangular, or any other suitable shape. The shelf 108 may be formed of materials including but not limited to aluminum, stainless steel, aramid fibers, polycarbonate, polypropylene, other metallic materials, composite materials, or other similar materials.

In some embodiments (such as in FIGS. 1-3), the shelf 108 may be positioned relative to a tray table 106 of the passenger seat 100. The shelf 108 may be independent of the tray table 106, e.g., a separate structure that can be moved separately from the tray table 106. The tray table 106 may be movable between a stowed tray table configuration (e.g., FIG. 2) and a deployed tray table configuration (e.g., FIGS. 1 and 3). The stowed tray table configuration may correspond to a state in which the tray table 106 is secured by a tray table latch 114 and/or a state in which the usable surface of the tray table 106 is received along the rearward surface 104. The deployed tray table configuration may correspond to a state in which the tray table 106 has been released from the tray table latch 114 and/or a state in which the usable surface of the tray table 106 is rotated away from the rearward surface 104 and is available for receiving items placed by a passenger.

In some embodiments (such as in FIGS. 9A and 9B), the tray table 106 may be moveable from the stowed tray table configuration to expose a space behind the tray table 106 and permit the shelf 108 to be deployed. For example, the tray table may be movable from the stowed tray table configuration (such as in FIG. 2 or FIG. 9A) in which the tray table 106 may at least partially hide, obscure, and/or block access to the shelf 108 and moveable to the deployed tray table configuration (such as in FIGS. 1 and 3 or FIG. 9B) in which the tray table 106 may expose, reveal, and/or permit access to the shelf 108, such as for deployment of the shelf 108.

In some embodiments (such as in FIGS. 2 and 9A), a stowed position of the shelf may correspond to a state in which the shelf 108 is positioned between the tray table 106 and the rearward surface 104 of the seat back 102. In some embodiments, the support surface 110 may be parallel to the rearward surface 104 when the shelf 108 is in the stowed position.

The pivot 112 may allow the shelf 108 (for example, once exposed by movement of the tray table 106) to move from the stowed position of the shelf to one or more deployed positions of the shelf, some examples of which are described further below. The stowed position of the shelf 108 may alternatively be referred to as the stowed shelf position, for example, to avoid confusion between the stowed shelf position and the stowed tray table configuration. More generally, any states (such as a deployed position, maximum deployed position, etc.) may alternatively be described with the term "shelf," or "support" included (such as deployed shelf position, deployed support position, maximum deployed shelf position, etc.) to provide additional clarity beyond the immediate context in which such states are described.

Figure 3:
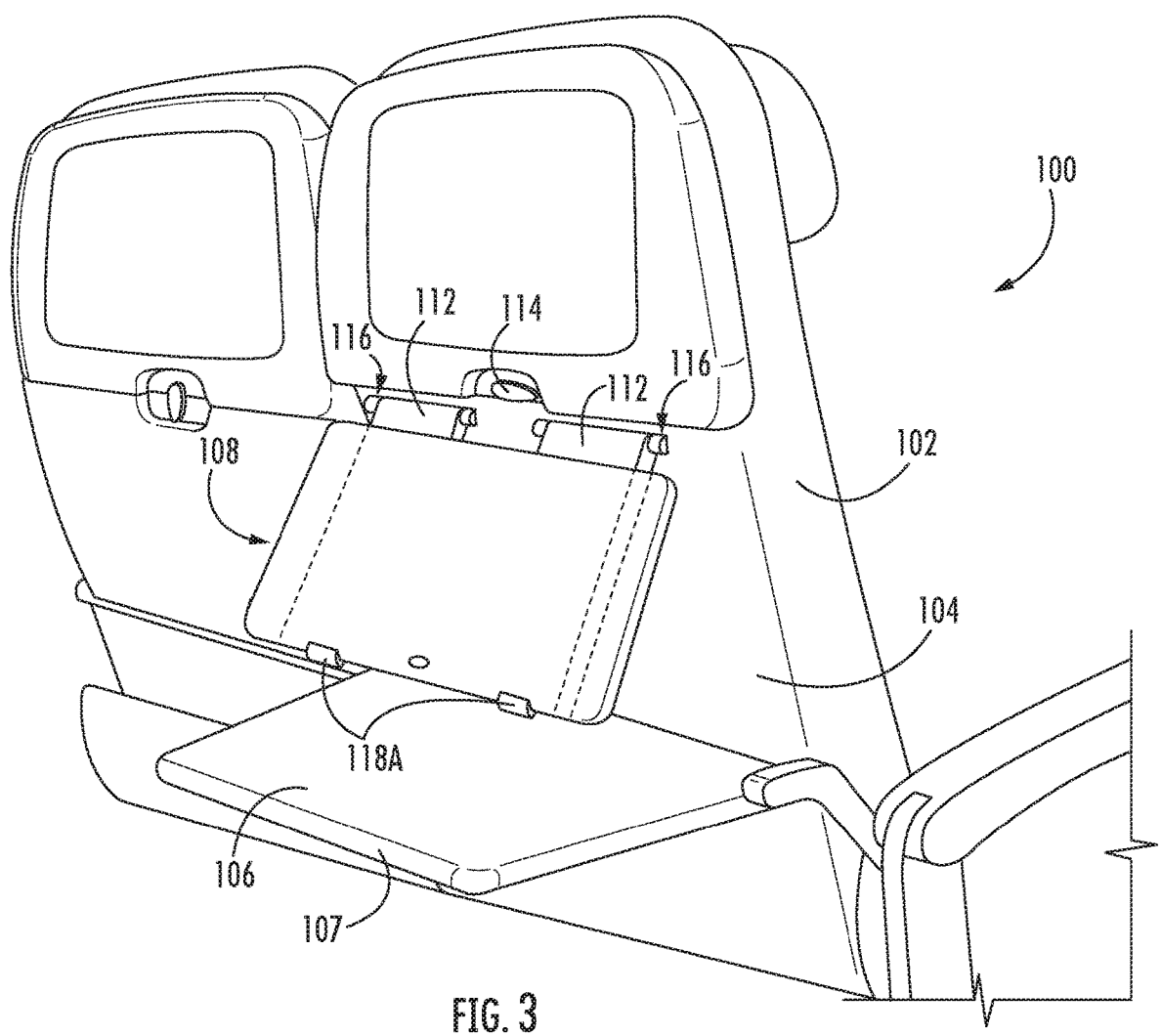
FIG. 3 is a perspective rear view of the seat of FIG. 1 with a personal electronic device supported by the secondary personal item support.
Figure 4:
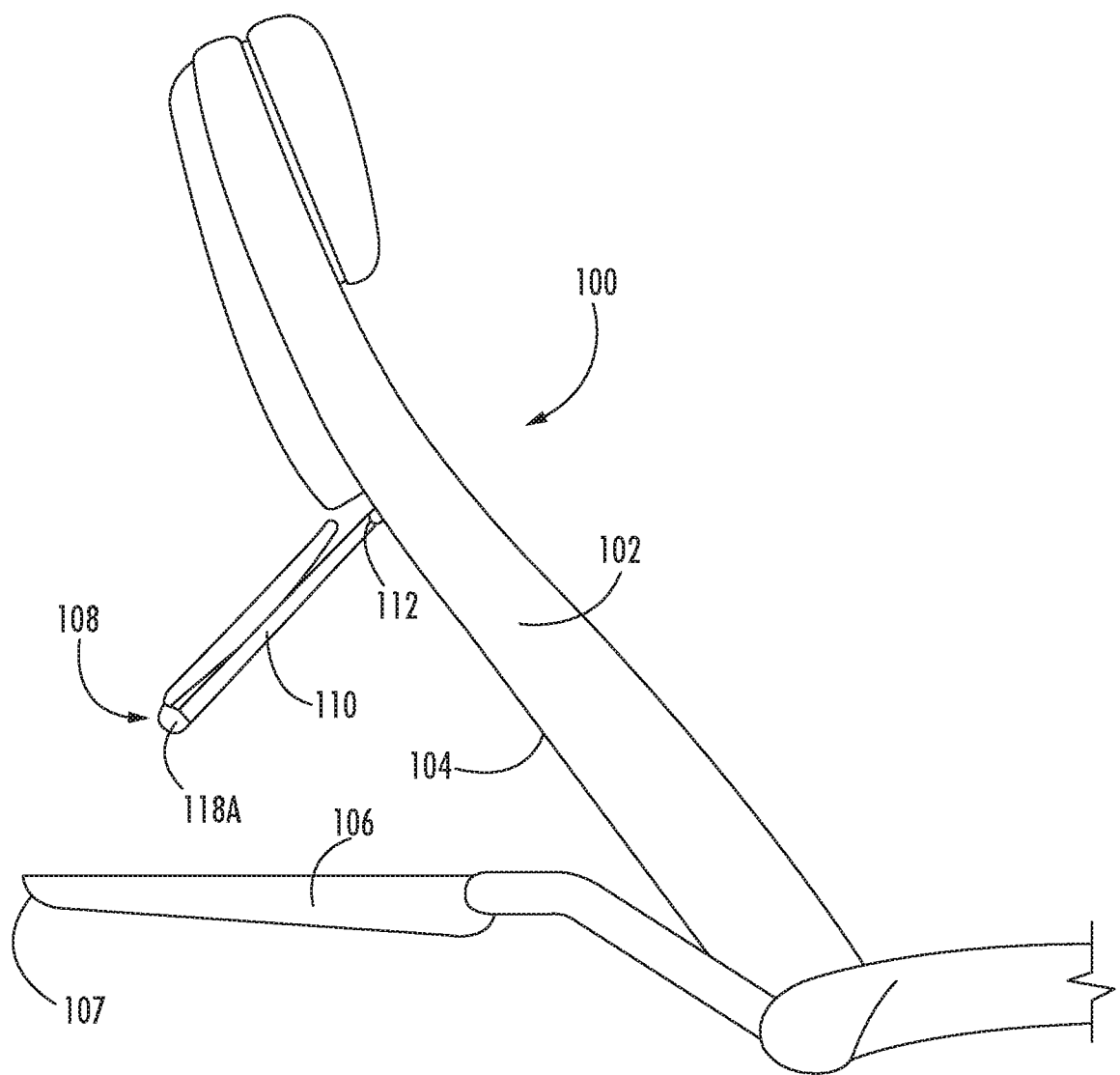
FIG. 4 is a side view of the seat of FIG. 3.
Figure 5:
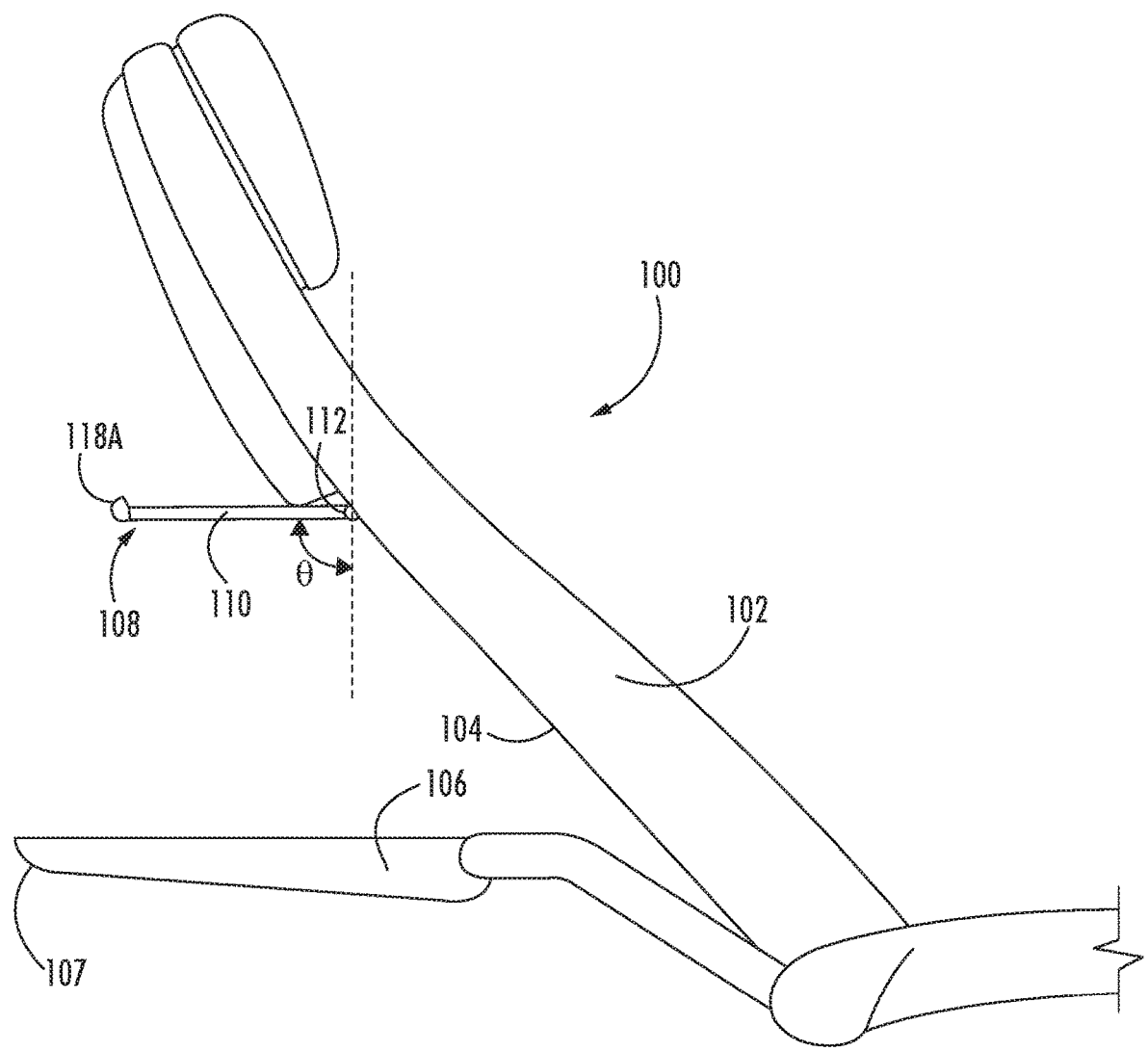
FIG. 5 is a side view of the seat of FIG. 1 with the secondary personal item support deployed to a maximum deployed position.

In some embodiments (such as in FIGS. 3-5), the shelf 108 when deployed is positioned above a tray table 106. The shelf 108 may be used simultaneously with the tray table 106 so that the user has an extra surface on which to place any personal items, for example, those that do not fit on the tray table 106. Referring to FIGS. 3 and 4, for example, the shelf 108 may hold and/or support a personal electronic device, such as a cell phone, a tablet, a laptop, an e-reader, an MP3 player, or a gaming system, or it may hold and/or support any other suitable item the user would like to place on it, such as a book or a magazine. By placing these items on the shelf 108, the user is able to have more free space on the tray table 106 for food and beverage items, or any other items the user would like to have available during the trip.

In some embodiments, the shelf 108 and/or support surface 110 may include at least one retainer 118 to help keep personal items in place when the items are being supported on the shelf 108. One example of a retainer 118 is the protrusion 118A shown in FIG. 3. Further examples of retainers 118 are discussed below in relation to FIG. 11.

In some embodiments, the shelf 108 may be maintained respectively at various different positions. For example, with reference to FIG. 5, the shelf 108 may have a maximum deployed position. The maximum deployed position may correspond to a position that the shelf 108 is designed to rotate to but not past, e.g., such that once the shelf 108 reaches this maximum deployed position, it may not be rotated past that position without damaging the shelf 108 or an associated component. In some embodiments, the shelf 108 may be designed so that the maximum deployed position occurs when the support surface 110 rotates to an angle θ. In some embodiments, the shelf 108 reaches the maximum deployed position when the support surface 110 reaches a horizontal orientation, e.g., when the angle θ is 90 degrees from vertical. In further embodiments, the shelf 108 reaches the maximum deployed position when angle θ is 93 degrees. This may correspond to the support surface 110 being 3 degrees above horizontal, for example, which may be consistent with an industry standard for an orientation of the tray table 106 in the deployed tray table configuration. In some embodiments, the angle θ at which the shelf 108 reaches the maximum deployed position may be set with reference to a fully reclined state of the seat back 102. More generally, although examples of specific angles and/or criteria that may be implemented for determining the maximum deployed position of the shelf 108 are provided, it is to be understood that angle θ may be any suitable angle.

In some embodiments (such as in FIGS. 1 and 6), the at least one pivot 112 may include two pivots 112. However, it is to be understood that the shelf 108 may have any number of suitable pivots 112. One example including a single pivot 112 is also discussed below in relation to FIG. 10.

The at least one pivot 112 may be attached at any suitable location along the rearward surface 104 of the seat back 102. For example, in embodiments that include at least two pivots 112 (such as in FIGS. 1 and 6), one pivot 112 may be positioned to the right side of a tray table latch 114 and another may be positioned to the left side of the tray table latch 114. The at least one pivot 112 may additionally or alternatively be positioned at any suitable position in a vertical direction along the seat back 102. In some embodiments, the at least one pivot 112 may attach to the rearward surface 104 at a location relative to (e.g., above or below) the uppermost edge 107 of the tray table 106 when tray table 106 is in a stowed tray table configuration. For example, the at least one pivot 112 (such as in FIGS. 1-2) may attach below the uppermost edge 107 of the tray table 106 when the tray table 106 is in a stowed tray table configuration, or the at least one pivot 112 (such as in FIG. 6) may attach above the uppermost edge 107 of the tray table 106 when tray table 106 is in a stowed tray table configuration.

Figure 6:
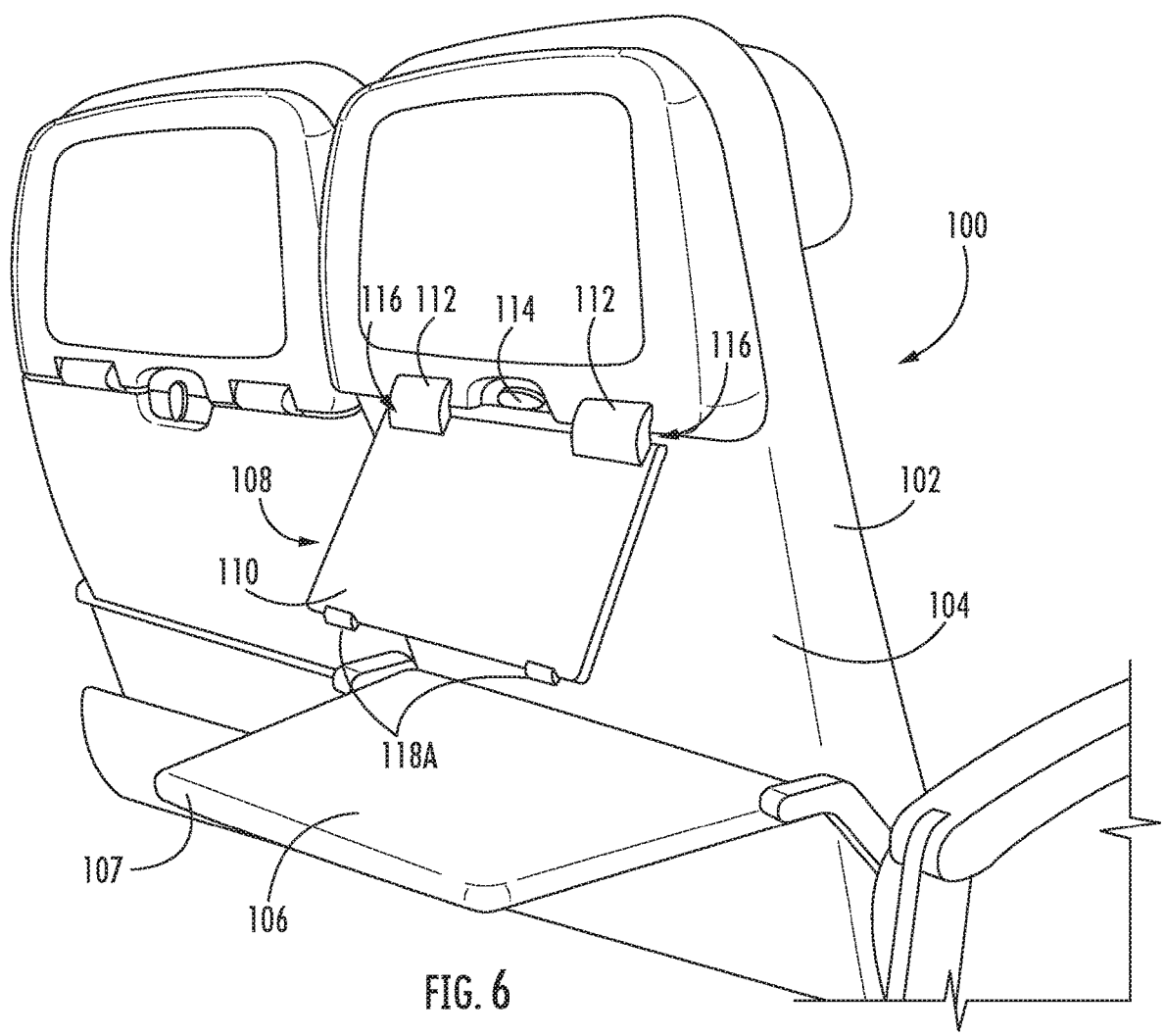
FIG. 6 is a perspective rear view of a seat with a secondary personal item support in a deployed position, according to certain embodiments of the present invention.
Figure 7:
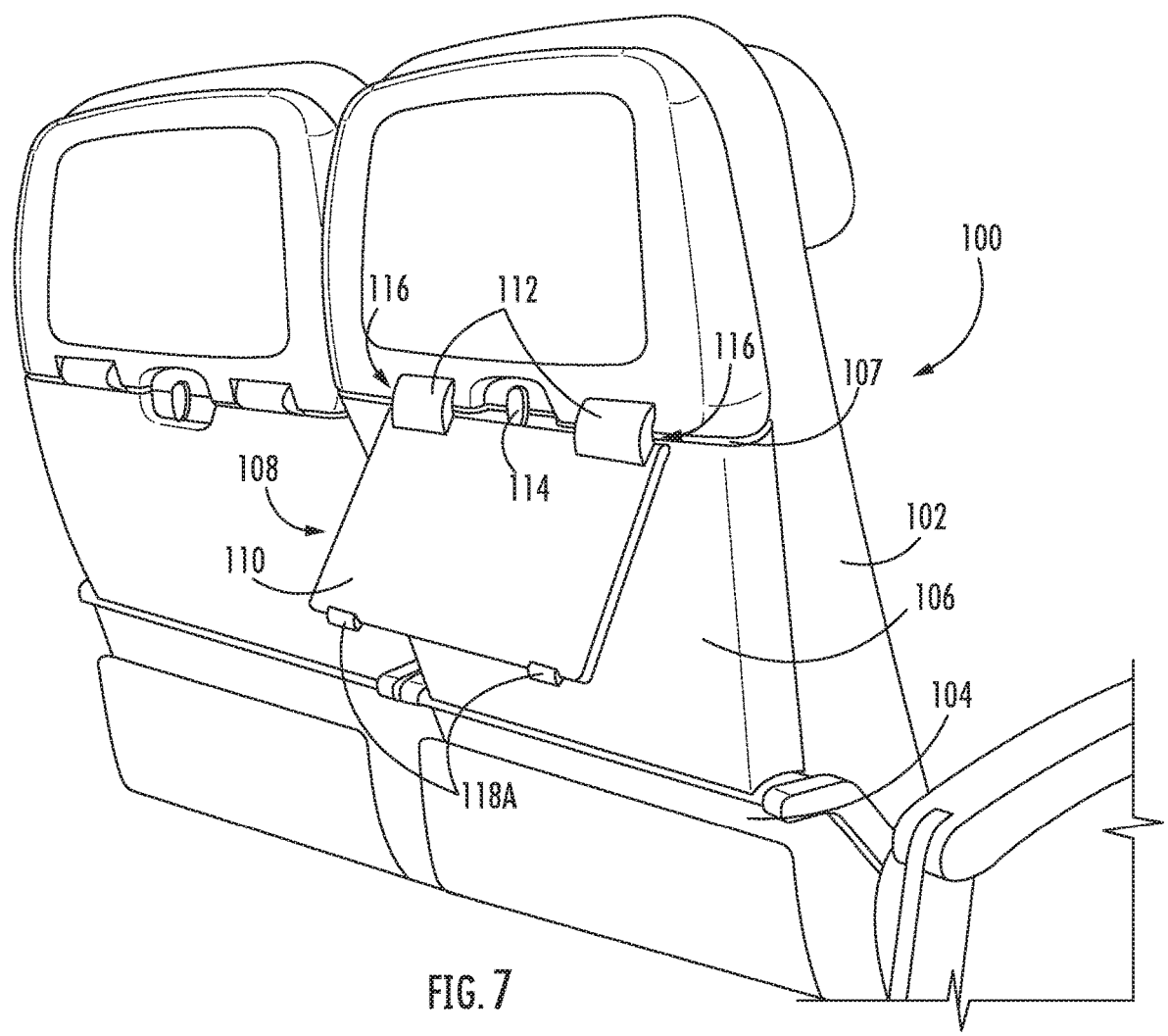
FIG. 7 is a perspective rear view of the seat of FIG. 6 with the secondary personal item support in a deployed position and a tray table in a stowed tray table configuration.
Figure 8:
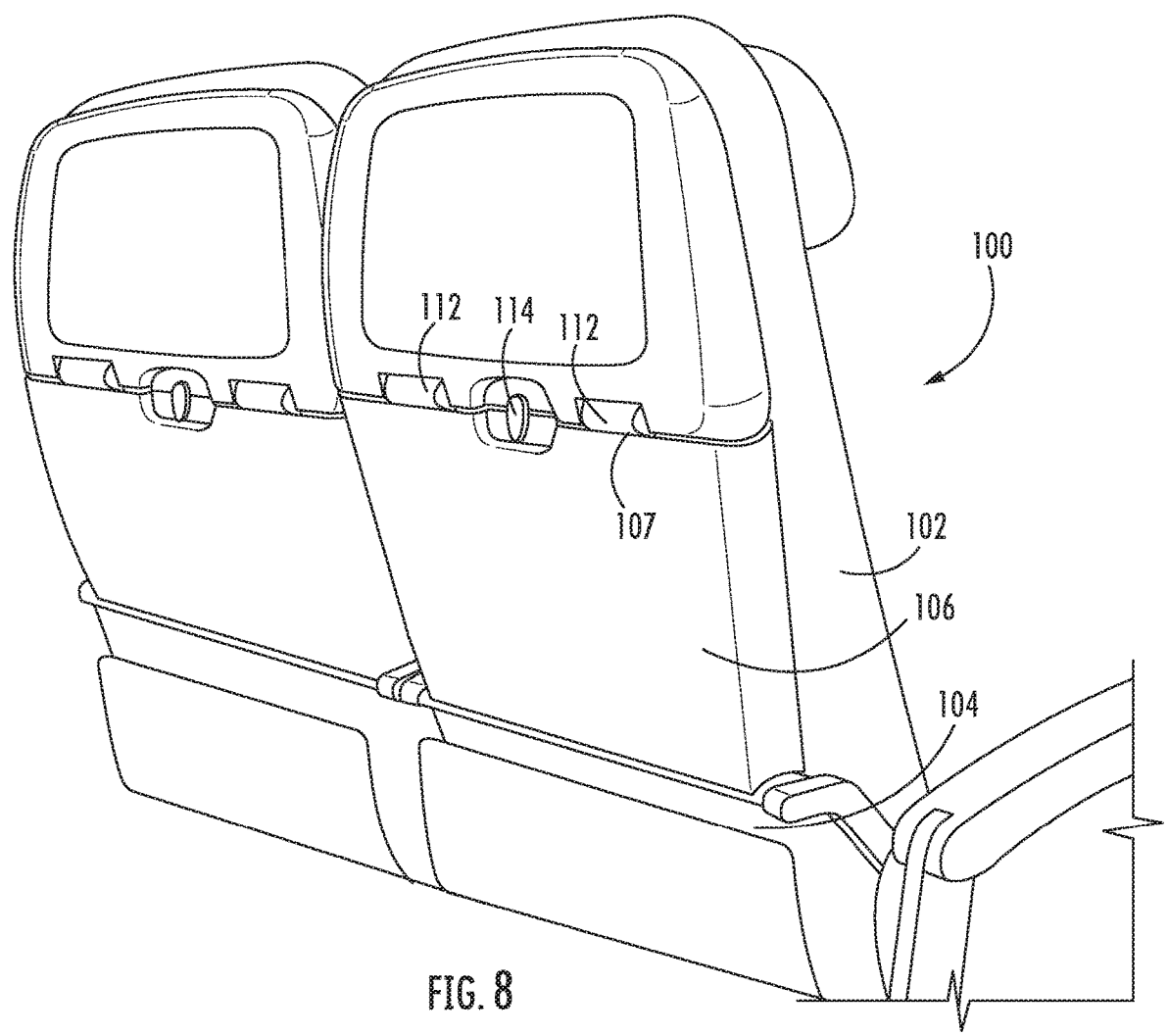
FIG. 8 is a perspective rear view of the seat of FIG. 6 with the secondary personal item support in a stowed position and the tray table in a stowed tray table configuration.
Figure 9A:
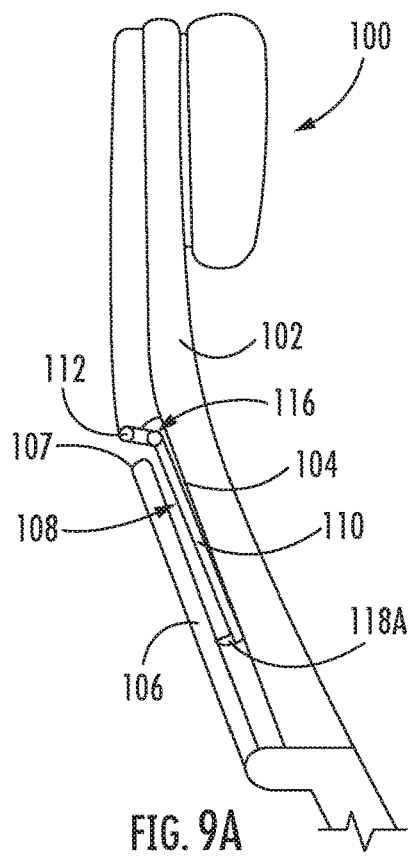
FIGS. 9A-D are side views of a seat with a secondary personal item support in various stowed and deployed positions and the tray table in various stowed and deployed tray table configurations, according to certain embodiments of the present invention.

Various, non-limiting examples of deployment of the tray table 106 and the shelf 108 are illustrated in FIGS. 9A-9D. It should be noted that features shown in FIGS. 9A-9D vary in some respects from those shown in other figures such as FIGS. 6-8. For example, FIGS. 9A-9D omit the tray table latch 114 to avoid obscuring the other features in the figures. It is to be understood that the tray table 106 may be designed to be stowed with or without a tray table latch 114. Additionally, FIGS. 9A-9D show a pivot 112 that is double-articulated, in contrast to a single-articulated version such as depicted in FIGS. 6-8. It is to be understood that the pivot 112 may include any suitable number of joints, articulations, or other components to facilitate the operations described. In some embodiments (such as illustrated in FIG. 9A), the protrusion 118A may be retractable or collapsible into or in the general direction of the shelf 108 and/or the support surface 110.

Figure 9B:
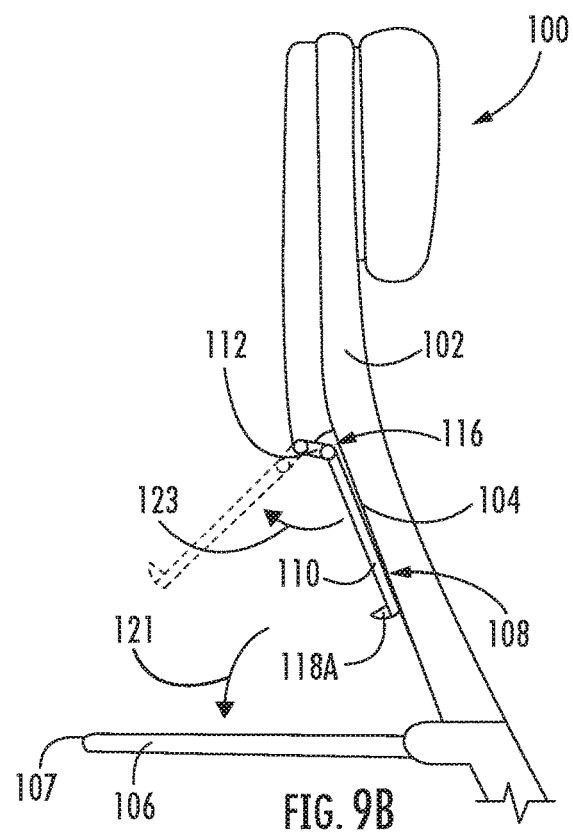

FIG. 9A shows an example of the tray table 106 in the stowed tray table configuration and the shelf 108 in the stowed position. FIG. 9B in contrast depicts an example in which the tray table 106 is shown in the deployed tray table configuration and the shelf 108 is shown alternatively in solid lines in the stowed position and in phantom lines in an intermediate deployed position. A user may deploy the tray table 106 (e.g., as illustrated by arrow 121 in FIG. 9B) to expose a space behind the tray table 106 and gain access to the shelf 108. After the user deploys the tray table 106, the shelf 108 may be rotated (e.g., as illustrated by arrow 123) from the stowed position to an intermediate deployed position, for example, by pivoting the shelf 108 away from the rearward surface 22. For example, the intermediate deployed position may be a position of the shelf 108 between the stowed position and the maximum deployed position. Depending on the type of stopper 116 implemented for the pivot 112, the shelf 108 may have a predetermined number of intermediate deployed positions or may have an infinite number of intermediate deployed positions.

Figure 9C:
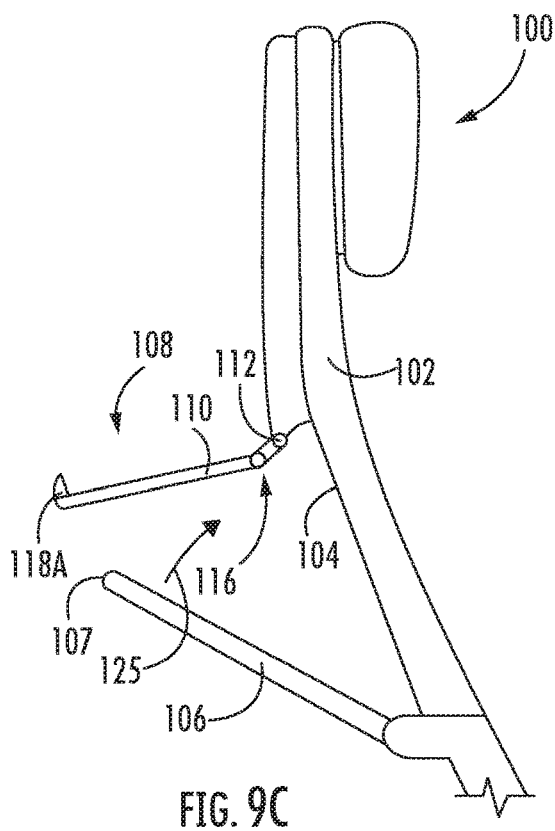
Figure 9D:
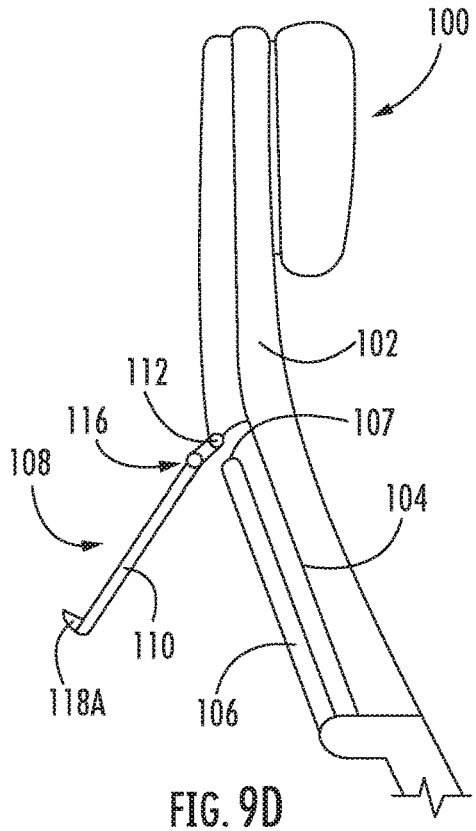

FIGS. 9C and 9D show an example of movement of the tray table 106 and the shelf 108 so that the user may stow the tray table 106 in the stowed tray table configuration while still having access to the shelf 108. As may be appreciated with particular reference to FIG. 9D, such functionality may be facilitated by the pivot 112 being attached to the rearward surface 104 above the uppermost edge 107 of the tray table 106 when the tray table 106 is in the stowed tray table configuration. However, it is to be understood that other designs of the attachment of pivot 112 may allow shelf 108 to still be accessible when the tray table 106 is stowed. In operation, the tray table 106 may be rotated (e.g., as illustrated by arrow 125 in FIG. 9C) from the deployed tray table configuration toward the stowed tray table configuration, which may involve the tray table 106 being rotated beneath the shelf 108. For example, in some embodiments, moving the shelf 108 to the maximum deployed position may facilitate clearance for the tray table 106 to rotate underneath the shelf 108, although in some embodiments, the tray table 106 may be able to fully rotate to the stowed tray table configuration without moving the shelf 108 from an intermediate deployed position. Once the tray table 106 has reached the stowed tray table configuration (e.g., FIG. 9D), the tray table 106 may be secured (e.g., by the tray table latch 114 referenced in other figures), for example, which may keep the tray table 106 out of the way while the shelf 108 remains deployed in a manner that facilitates ease of passenger egress or ingress or otherwise adds to available space beneath and/or adjacent the shelf 108.

Figure 10:
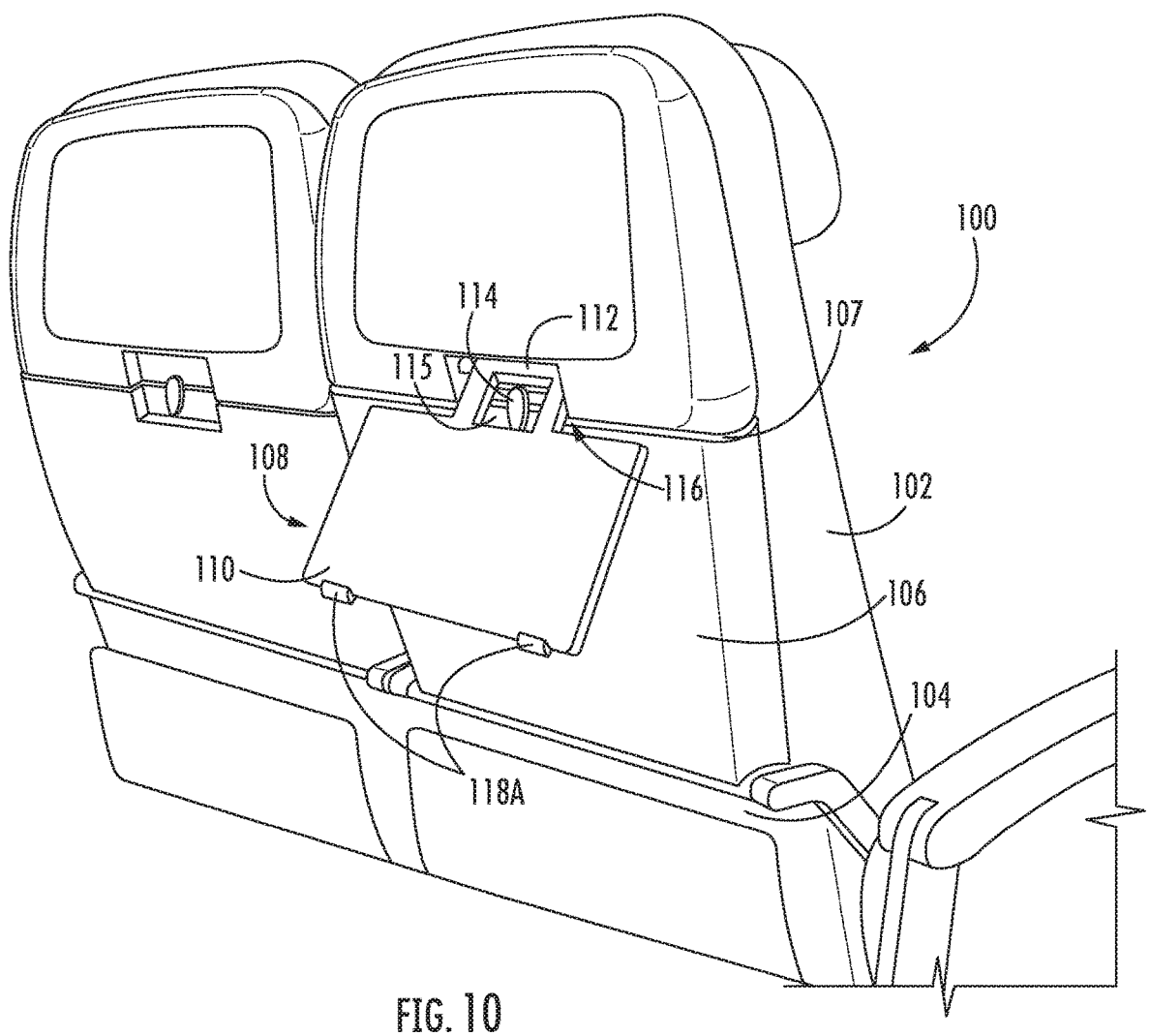
FIG. 10 is a perspective rear view of a seat with a secondary personal item support in a deployed position, according to certain embodiments of the present invention.

As previously mentioned, in some embodiments the at least one pivot 112 may be a single pivot 112. One example of such an arrangement is illustrated in FIG. 10. The single pivot 112 may be centrally positioned along an attachment edge of the shelf 108, which may correspond to an edge of the shelf 108 that attaches to the rearward surface 104.

In FIG. 10, the shelf 108 is depicted with an opening 115. The opening 115 may be positioned to provide access through the shelf 108 to the tray table latch 114. The opening 115 may be particularly useful in embodiments (such as in FIG. 10) in which the pivot 112 attaches to the rearward surface 104 above the uppermost edge 107 of the tray table 106 when the tray table 106 is in the stowed tray table configuration. Embodiments featuring a single pivot 112 are not limited to attachment above the uppermost edge 107, however. In some embodiments a single pivot 112 may attach to the rearward surface behind the tray table 106. Moreover, in some embodiments, the opening 115 may be omitted. For example, the opening 115 may be superfluous in embodiments in which the single pivot 112 attaches to the rearward surface 104 behind the tray table 106 (e.g., in which case, the shelf 108 may avoid being in a position to obstruct the tray table latch 114 regardless of whether the opening 115 is present or absent).

Figure 11:
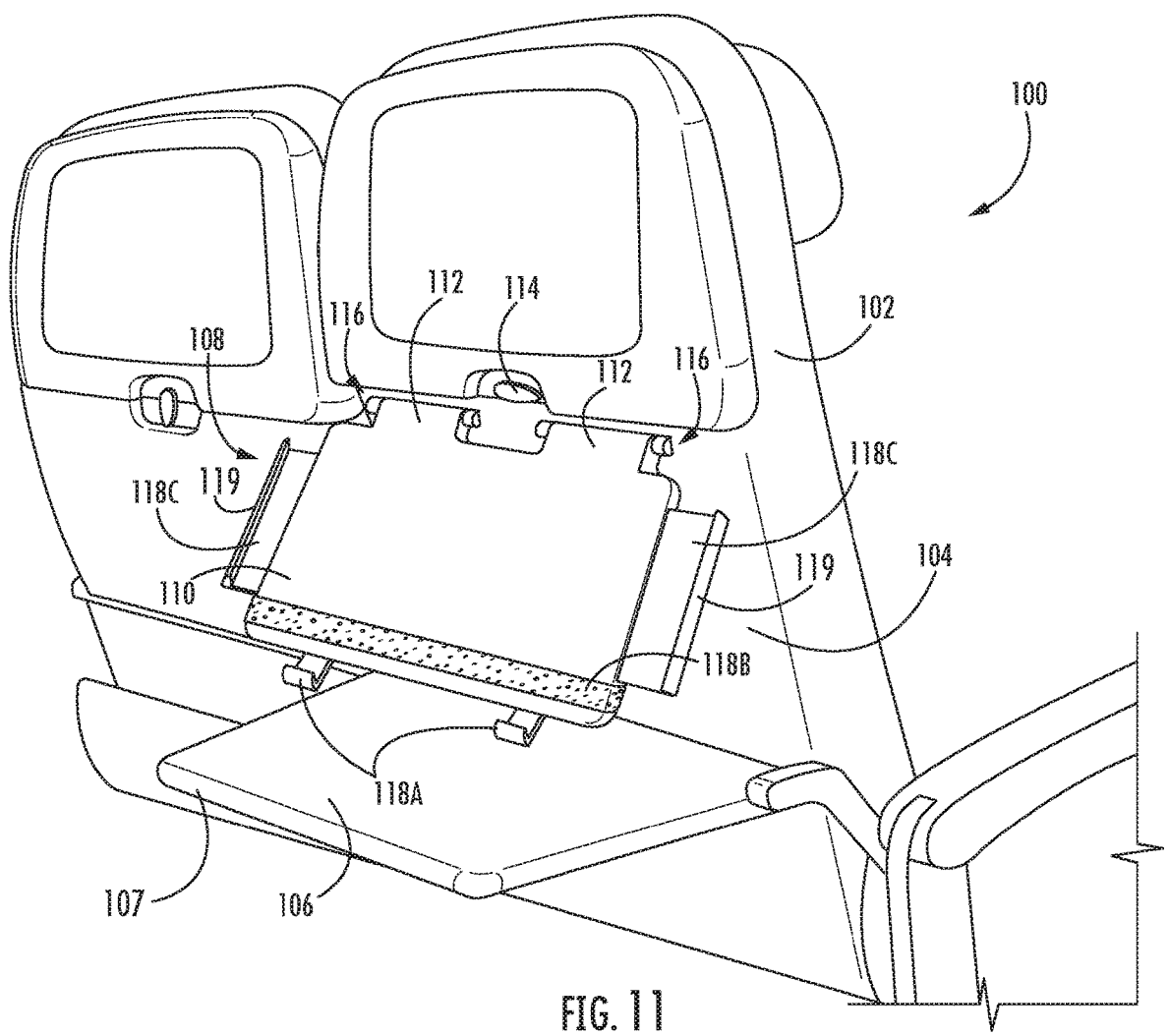
FIG. 11 is a perspective rear view of the seat of FIG. 1 with the secondary personal item support including various examples of retainers.

As previously discussed, the shelf 108 and/or support surface 110 may include at least one retainer 118 to help keep personal items in place when the items are being supported on the shelf 108. Different types of retainers 118 are depicted in FIG. 11 with different letter suffixes. For example, specific examples of retainers 118 shown in FIG. 11 include protrusions 118A, straps 118B, and extenders 118C. Retainers 118 are not limited to these examples however, and may include any suitable structure or feature for providing and/or improving a retention of an item on the shelf 108, including but not limited to a sticky or high-friction coating, a static-cling coating, or any other suitable gripping or retaining structure. As further examples, the support surface 110 may be constructed of or at least partially covered with a gripping material, e.g., silicone, rubber, or any other suitable material.

In some embodiments (such as in FIG. 11), the at least one retainer 118 may include at least one strap 118B. The at least one strap 118B may be positioned in any manner across the support surface 110 (e.g., horizontally, vertically, diagonally), and it is to be understood that the shelf 108 may include any suitable number of straps 118B arranged in any suitable orientation or combination of orientations.

The at least one retainer 118 may additionally or alternatively include at least one protrusion 118A. The at least one protrusion 118A may be positioned at any suitable location on shelf 108, including but not limited to the bottom and side edges of the shelf 108 and/or on the support surface 110. In some embodiments (such as in FIG. 11), at least some part of the at least one protrusion 118A may be extendable in an outward direction away from the shelf 108 and/or the support surface 110, e.g., which may allow for a variety of differently sized personal items to be supported by and retained by the shelf 108.

In some embodiments (such as also in FIG. 11), the retainer may include at least one extender 118C that may include a panel, shaft, or other member slidable or otherwise movable or extendable from the support surface 110 to adjust the size of items that can be accommodated by the support surface 110 and allow for a variety of differently sized personal items to be supported by the shelf 108. The at least one extender 118C may extend from any suitable edge or edges of the shelf 108 and there may be multiple extenders 118C that may extend from a single edge of the shelf 108. In some embodiments, the at least one extender 118C does not extend past the edge of the corresponding passenger seat 100 so as not to encroach on the space of a user in another seat. In some embodiments, the extender 118C includes flanges 119 that extend upward relative to the support surface 110. For example, the extenders 118C may be moved toward one another in a pincher movement such that the flanges 119 may grip an item from opposite sides and hold the item in place relative to the shelf 108. In some embodiments, a similar pincher effect may be achieved with one flange 119 that is moveable relative to a stationary flange 119 or other stationary structure of the shelf 108. Additionally or alternatively, the flanges 119 may be retractable or collapsible into or in the general direction of the extender 118C.

While certain features of the passenger seat 100 and shelf 108 may be shown in combination with other features in the figures, it is to be understood that any functional combination of the features disclosed may be used. For example, although examples of retainers 118 are specifically depicted in FIG. 11 with a shelf 108 having two pivots 112 attached below a tray table latch 114, retainers could equally be used individually or in combination with other arrangements, which may include, but are not limited to, versions of the shelf 108 that are attached by a different number of pivots 112 and/or at a different relative location relative to the tray table latch 114.

Figure 12:
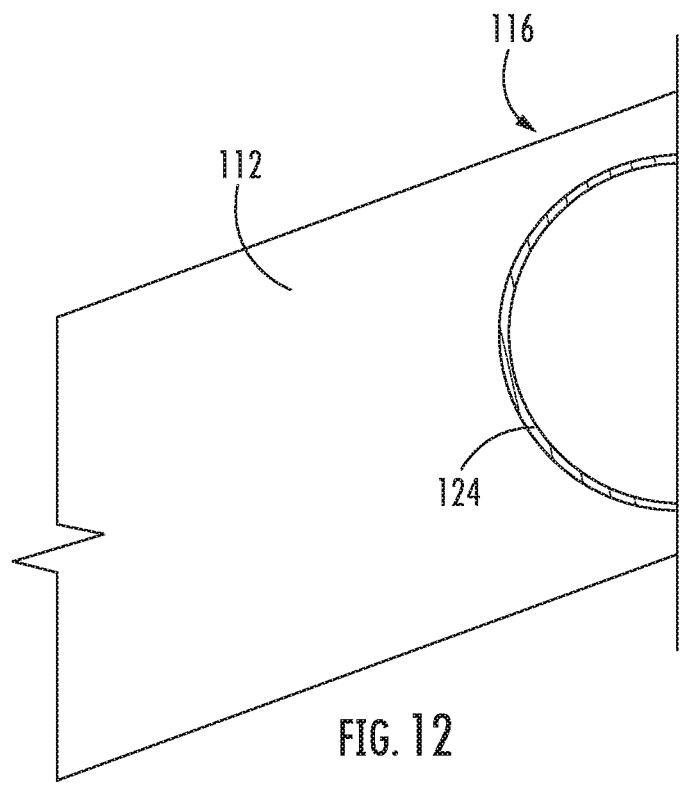
FIG. 12 is a side view of one example of a pivot of a secondary personal item support, according to certain embodiments of the present invention.
Figure 13:
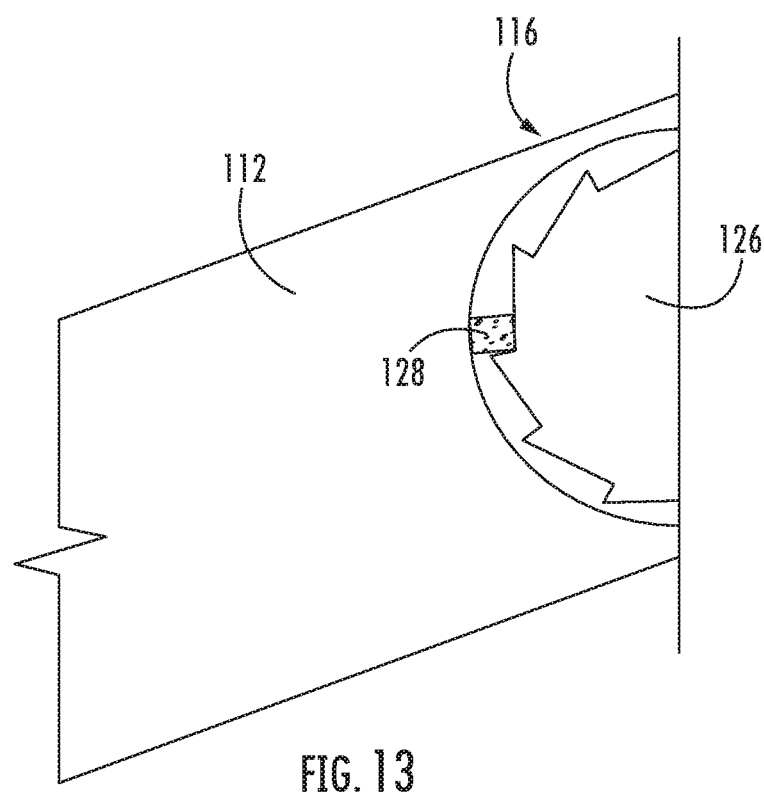
FIG. 13 is a side view of another example of a pivot of a secondary personal item support, according to certain embodiments of the present invention.

As previously noted, in some embodiments, the shelf 108 comprises at least one stopper 116 that may maintain the support surface 110 in respective positions, such as the stowed position, the maximum deployed position, at least one intermediate deployed position, etc. The stopper 116 may include any suitable structure to achieve this function. Some examples are shown in FIGS. 12 and 13, although the stopper 116 is not limited to these examples. In some embodiments (such as in FIG. 12), the stopper 116 may include a continuous friction interface 124, for example, which may allow a user to pivot the shelf 108 to an infinite number of intermediate deployed positions. As a non-limiting example, the continuous friction interface 124 may include a sleeve positioned in an interference fit (or with some other controlled amount of deformation to provide a controlled amount of friction) between a rod and an inner wall of a tubular structure, although other suitable structures may be utilized. In some embodiments (such as in FIG. 13), the stopper 116 may include a predetermined pivot stop 126, e.g., which may allow a user to pivot the shelf 108 to a predetermined number of intermediate deployed positions. As a non-limiting example, the predetermined pivot stop 126 may function by using a flexible peg 128 that allows the user to ratchet the shelf 108 between the stowed position, the maximum deployed position, and a predetermined number of intermediate deployed positions. However, this is not the only option, and any sort of ratcheting or incrementing device may be used as the predetermined pivot stop 126.

In the following, further examples are described to facilitate the understanding of the invention (and in some aspects, features of an apparatus or system described in one or more of these examples can be utilized in a method described in one of the other examples or vice versa):

Example #1. A passenger seat (which may incorporate features of any of the subsequent examples) comprising:
  a seat back comprising a rearward surface; a tray table deployable away from the rearward surface of the seat back; and a shelf independent from the tray table and comprising a support surface and at least one pivot pivotally coupling the support surface to the rearward surface of the seat back.

Example #2. The passenger seat of example #1 or any of the preceding or subsequent examples, wherein the support surface is pivotally coupled to the rearward surface of the seat back for movement between (a) a stowed position in which the shelf is located between the rearward surface and the tray table, and (b) a deployed position in which the shelf is pivoted away from the rear surface.

Example #3. The passenger seat of example #2 or any of the preceding or subsequent examples, further comprising at least one stopper that maintains the support surface in at least one intermediate deployed position in between the stowed position and the deployed position.

Example #4. The passenger seat of example #1 or any of the preceding or subsequent examples, wherein the at least one pivot comprises a left pivot and a right pivot, wherein the left pivot is attached to the rearward surface of the seat back and to a left side of a tray table latch, and wherein the right pivot is attached to the rearward surface of the seat back and to a right side of the tray table latch.

Example #5. The passenger seat of example #1 or any of the preceding or subsequent examples, wherein the at least one pivot is attached to the rearward surface at least partially above a position of a tray table outer edge that is uppermost on the tray table in a stowed tray table configuration.

Example #6. The passenger seat of any example #2 or of the preceding or subsequent examples, wherein the shelf in the deployed position is positioned over the tray table in a deployed tray table configuration and is positioned so that the tray table is between the shelf and the rearward surface in a stowed tray table configuration.

Example #7. A shelf (which may incorporate features of any of the subsequent examples) comprising:
  a support surface;
  at least one pivot by which the support surface is pivotally coupleable with a rearward surface of a seat back of a passenger seat for movement of the support surface between a stowed position and a maximum deployed position; and
  at least one stopper that maintains the support surface in at least one intermediate deployed position in between the stowed position and the maximum deployed position.

Example #8. The shelf of example #7 or any of the preceding or subsequent examples, wherein the shelf is independent of a tray table deployable from the rearward surface of the seat back of the passenger seat.

Example #9. The shelf of example #8 or any of the preceding or subsequent examples, wherein the shelf in the at least one intermediate deployed position is accessible with the tray table stowed relative to the seat back.

Example #10. The shelf of example #8 or any of the preceding or subsequent examples, wherein in the stowed position, the support surface is positioned between the seat back and the tray table.

Example #11. The shelf of example #7 or any of the preceding or subsequent examples, wherein in the stowed position, the support surface is positioned parallel to the rearward surface of the seat back.

Example #12. The shelf of example #7 or any of the preceding or subsequent examples, wherein the maximum deployed position is three degrees above horizontal in a reclined state of the seat back.

Example #13. The shelf of example #7 or any of the preceding or subsequent examples, wherein the stopper comprises a continuous friction interface configured to allow the shelf to pivot smoothly to and remain at the at least one intermediate deployed position.

Example #14. The shelf of example #7 or any of the preceding or subsequent examples, wherein the stopper comprises at least one predetermined pivot stop configured to allow the shelf to incrementally pivot to and remain at the at least one intermediate deployed position.

Example #15. The shelf of example #7 or any of the preceding or subsequent examples, further comprising at least one retainer.

Example #16. The shelf of example #15 or any of the preceding or subsequent examples, wherein the retainer comprises at least one of:
  at least one strap;
  at least one projection; or
  at least one extender extendable from at least one of a bottom edge, a left edge, or a right edge of the support surface.

Example #17. A method (which may incorporate features of any of the preceding or subsequent examples) comprising:
  deploying a tray table from a rearward side of a passenger seat;
  exposing a space behind the tray table as a result of the deploying the tray table; and
  deploying a shelf from the space exposed.

Example #18. The method of example #17 or any of the preceding or subsequent examples, further comprising:
  supporting an object on a support surface of the shelf.

Example #19. The method of example #17 or any of the preceding or subsequent examples, further comprising:
  stowing the tray table along the rearward side of the passenger seat while the shelf is maintained in a deployed position.

Example #20. The method of example #17 or any of the preceding or subsequent examples, wherein the deploying the shelf comprises pivoting the shelf away from the rearward side of the passenger seat and about a pivot member that pivotally couples the shelf with the rearward side of the passenger seat.

Different arrangements of the components depicted in the drawings or described above, as well as components and steps not shown or described, are possible. Similarly, some features and sub-combinations are useful and may be That which is claimed is:

1. A passenger seat comprising:
a seat back comprising a rearward surface;
a tray table deployable away from the rearward surface of the seat back; and
a shelf independent from the tray table and comprising a support surface and at least one pivot pivotally coupling the support surface to the rearward surface of the seat back;
wherein the at least one pivot is attached to the rearward surface at least partially above a position of a tray table outer edge that is uppermost on the tray table in a stowed tray table configuration;
wherein the shelf is movable between (a) a stowed position in which the shelf is located between the rearward surface and the tray table, and (b) at least one usable position in which the shelf is pivoted away from the rear surface and configured to support an object on the support surface; and
wherein an angle between the shelf at the at least one usable position and a vertical axis is less than 90 degrees.

2. The passenger seat of claim 1, wherein the shelf has a maximum deployed position at which the shelf is pivoted to three degrees above horizontal in a reclined state of the seat back.

3. The passenger seat of claim 1, further comprising at least one stopper that maintains the support surface in the at least one usable position.

4. The passenger seat of claim 1, wherein the at least one pivot comprises a left pivot and a right pivot, wherein the left pivot is attached to the rearward surface of the seat back and to a left side of a tray table latch, and wherein the right pivot is attached to the rearward surface of the seat back and to a right side of the tray table latch.

5. The passenger seat of claim 1, the shelf is movable to at least a second usable position in which the shelf is configured to support the object on the support surface.

6. The passenger seat of claim 1, wherein the shelf in the at least one usable position is positioned over the tray table in a deployed tray table configuration and is positioned so that the tray table is between the shelf and the rearward surface in the stowed tray table configuration.

7. The shelf of claim 1, wherein the support surface is moveable to at least a second intermediate deployed position in which the shelf is configured to support the object on the support surface.

8. A shelf comprising:
a support surface;
at least one pivot by which the support surface is pivotally coupleable with a rearward surface of a seat back of a passenger seat for movement of the support surface between a stowed position and a maximum deployed position; wherein the at least one pivot is attached to the rearward surface at least partially above a position of a tray table outer edge that is uppermost on a tray table of the passenger seat in a stowed tray table configuration; and wherein the support surface is positioned between the seat back and the tray table in the stowed position; and
at least one stopper that maintains the support surface in at least one intermediate deployed position in between the stowed position and the maximum deployed position; wherein the support surface supports an object in the at least one intermediate deployed position; and wherein an angle between the support surface in the at least one intermediate deployed position and a vertical axis is less than 90 degrees.

9. The shelf of claim 8, wherein the shelf is independent of the tray table deployable from the rearward surface of the seat back of the passenger seat.

10. The shelf of claim 8, wherein the shelf in the at least one intermediate deployed position is accessible with the tray table stowed relative to the seat back.

11. The shelf of claim 8, wherein in the stowed position, the support surface is positioned parallel to the rearward surface of the seat back.

12. The shelf of claim 8, wherein the maximum deployed position is three degrees above horizontal in a reclined state of the seat back.

13. The shelf of claim 8, wherein the stopper comprises a continuous friction interface configured to allow the shelf to pivot smoothly to and remain at the at least one intermediate deployed position.

14. The shelf of claim 8, wherein the stopper comprises at least one predetermined pivot stop configured to allow the shelf to incrementally pivot to and remain at the at least one intermediate deployed position.

15. The shelf of claim 8, further comprising at least one retainer.

16. The shelf of claim 15, wherein the retainer comprises at least one of:
at least one strap;
at least one projection; or
at least one extender extendable from at least one of a bottom edge, a left edge, or a right edge of the support surface.

17. A method comprising:
deploying a tray table from a rearward side of a passenger seat;
exposing a space behind the tray table as a result of deploying the tray table;
deploying a shelf from the space exposed; wherein deploying the shelf comprises pivoting the shelf away from the rearward side of the passenger seat and about a pivot member that pivotally couples the shelf with the rearward side of the passenger seat at least partially above a position of a tray table outer edge that is uppermost on the tray table in a stowed tray table configuration; and
supporting an object on the shelf deployed to a usable position, wherein an angle between the shelf at the usable position and a vertical axis is less than 90 degrees.

18. The method of claim 17, further comprising:
supporting the object on the shelf deployed to at least a second usable position.

19. The method of claim 17, further comprising:
stowing the tray table along the rearward side of the passenger seat while the shelf is maintained in a deployed position.

20. The method of claim 17, wherein the shelf is independent of the tray table.

\* \* \* \* \*